United States Patent
Lee (10) Patent No.: US 11,867,533 B2
(45) Date of Patent: Jan. 9, 2024

(54) SENSING SYSTEMS AND METHODS

(71) Applicant: THE BOEING COMPANY, Chicago, IL (US)

(72) Inventor: Donald B. Lee, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 653 days.

(21) Appl. No.: 15/903,195

(22) Filed: Feb. 23, 2018

(65) Prior Publication Data

US 2019/0263339 A1 Aug. 29, 2019

(51) Int. Cl.
| | | |
|---|---|---|
| G01D 21/00 | (2006.01) | |
| B60R 16/03 | (2006.01) | |
| G01D 7/00 | (2006.01) | |
| G01D 15/00 | (2006.01) | |
| H02J 50/20 | (2016.01) | |

(52) U.S. Cl.
CPC ............ *G01D 21/00* (2013.01); *B60R 16/03* (2013.01); *G01D 7/00* (2013.01); *G01D 15/00* (2013.01); *H02J 50/20* (2016.02); *B60R 2300/406* (2013.01)

(58) Field of Classification Search
CPC .... B60R 16/03; B60R 2300/406; H02J 50/20; B60Q 3/70; B60Q 9/00; G01D 7/00; G01D 15/00; G01D 21/00; H04W 76/14
See application file for complete search history.

(56) References Cited

U.S. PATENT DOCUMENTS

| | | | | |
|---|---|---|---|---|
| 4,765,434 A | * | 8/1988 | Kawamoto | B60K 23/0808 180/249 |
| 6,281,787 B1 | * | 8/2001 | Lerg | B60C 23/063 340/442 |
| 7,221,187 B1 | * | 5/2007 | Snyder | G06F 1/08 326/41 |
| 10,375,356 B2 | * | 8/2019 | Sannala | G08B 17/113 |
| 2009/0152943 A1 | * | 6/2009 | Diab | B60R 16/023 307/10.1 |
| 2010/0187903 A1 | * | 7/2010 | Diab | B60R 16/023 307/9.1 |

(Continued)

FOREIGN PATENT DOCUMENTS

| | | | | |
|---|---|---|---|---|
| EP | 1843161 B1 | * | 3/2009 | ............ B28C 7/02 |
| WO | WO-2014134516 A1 | * | 9/2014 | .......... G06F 21/552 |
| WO | WO-2017215931 A1 | * | 12/2017 | .......... G01M 15/102 |

OTHER PUBLICATIONS

WO2017215931, Emission Control Procedure (machine translated) (Year: 2017).*

Primary Examiner — Frederick M Brushaber
(74) Attorney, Agent, or Firm — Joseph M. Butscher; The Small Patent Law Group LLC (57) ABSTRACT

Systems and methods provide for a sensing system for a vehicle system. The sensor monitors including a control circuit having one or more processors. The control circuit is communicatively coupled to a switch based on a Power over Ethernet (PoE) interface. The control circuit receives power from the PoE network switch. The sensor monitors include an interface circuit bi-directionally communicating with one or more sensors to acquire sensor measurements. The control circuit transmits the sensor measurements to the switch using the PoE interface.

21 Claims, 7 Drawing Sheets

(56) References Cited

U.S. PATENT DOCUMENTS

| | | | |
|---|---|---|---|
| 2011/0209551 A1* | 9/2011 | Helldorfer | B60R 21/0132 |
| | | | 73/658 |
| 2012/0173900 A1* | 7/2012 | Diab | H04L 12/10 |
| | | | 713/310 |
| 2012/0194552 A1* | 8/2012 | Osterhout | G02B 27/0093 |
| | | | 345/633 |
| 2017/0059698 A1* | 3/2017 | Stokes | B06B 1/0223 |
| 2017/0168503 A1* | 6/2017 | Amla | B60W 30/165 |
| 2020/0161861 A1* | 5/2020 | Schneider | H02J 13/00028 |
| 2020/0322868 A1* | 10/2020 | Claffey | H04W 40/02 |

\* cited by examiner

SENSING SYSTEMS AND METHODS

FIELD

Embodiments of the present disclosure generally relate to sensing systems and methods.

BACKGROUND

Conventional sensor modules require single mode sensors. Certain known single mode sensors are bulky and may interface with specialized systems. The specialized systems interpret, analyze, and react to the sensor data acquired by the single mode sensors. Notably, the specialized systems are not readily expandable due to limited interface ports, wiring installation, certification concerns, and cost.

Certain known single mode sensors include smoke detection systems, humidity sensors for an environmental control system, and a humidity sensor for a cabin services system. The size of each sensor module typically limits the number and type of sensors available within a particular area.

SUMMARY

A need exists for systems and/or methods that provide a common interface for sensor monitors such as may be compatible with different vehicle systems.

With that need in mind, certain embodiments of the present disclosure provide a sensing system for a vehicle system. The sensing system including a control circuit having one or more processors. The control circuit is communicatively coupled to a switch based on a Power over Ethernet (PoE) interface. The control circuit also receives power from the PoE interface. The sensor monitor includes an interface circuit. The interface circuit bi-directionally communicates with one or more sensors to acquire sensor measurements. The control circuit transmits the sensor measurements to a network through the PoE network switch using the PoE interface.

Optionally, the control circuit is a system on chip having an analog array, digital circuit blocks, a radio frequency (RF) interface, and one or more applications corresponding to a sensor protocol. The one or more applications including at least one a Wireless Personal Area Network utilizing 6Low-PAN or a Thread protocol. Additionally or alternatively the RF interface includes at least one of a BLUETOOTH Low Energy (BTLE), a ZIGBEE, or a wireless universal serial bus (USB).

Optionally, the interface circuit communicates utilizing an analog signal, an inter-integrated circuit (I2C) protocol, a serial peripheral interface bus protocol (SPI), or data packets. Additionally or alternatively, the sensing system includes a removable memory card to store one or more sensor measurements onto a removable memory card. The removable memory card is configured for a Micro SD card memory, a flash memory, a multimedia card memory, or an SD card memory. Optionally, the sensing system includes an RF interface operably coupled to the control circuit. The RF interface includes at least one of a BTLE, a ZIGBEE, or a wireless USB. The RF interface defines wireless bridges to one or more sensors. Optionally, the control circuit is operably coupled to a network interface port using PoE interface. The network interface port including a plurality of twisted pair cables that couple the network interface port to the switch. The network interface port provides a common interface for coupling to an electrical power system of a vehicle system.

Optionally, the one or more sensors include at least one of a visible light sensor, an ultraviolet sensor, an infrared sensor, a light amplification by stimulated emission of radiation (e.g., LASER) light sensor, a multi-spectrum light module, a visible light camera, a visible and/or infrared red light camera, a forward looking infrared (e.g., Long Wavelength Infrared (LWIR) or Forward Looking Infrared (FLIR)) camera, an ultrasonic sensor, an audio sensor, a temperature sensor, a humidity sensor, a vibration sensor, a magnetic sensor, an air pressure sensor, and airflow sensor, a multi-sensor module, a carbon dioxide sensor, an oxygen sensor, a methane sensor, an ammonia sensor, an olfactory sensor, a shock/crash sensor, a proximity sensor, a force sensor, a load sensor, a torque sensor, a strain sensor, a position sensor, a motion/velocity sensor, a radio frequency sensor, a discrete input sensor, a discrete output sensor, an analog input sensor, an analog output sensor, a voltage sensor, a current sensor, a frequency sensor, and/or the like. Additionally or alternatively, the PoE network switch communicates with the control system. The control system including a display. The display includes a user interface or a graphical user interface to display the sensor measurements of the one or more sensors. Additionally or alternatively, the vehicle system includes a locomotive, a marine vessel, an airplane, or an automobile.

In an embodiment, a sensing method for a vehicle is provided. The method includes enabling a Power over Ethernet (PoE) interface through a network interface port. The network interface port including a plurality of twisted pair cables that couple the network interface port to a PoE network switch. The network interface port provides a common interface for coupling to an electrical power system of a vehicle system. The method includes providing an interface circuit. The interface circuit bi-directionally communicates with one or more sensors to acquire sensor measurements. The sensor measurements are transmitted to a network through the PoE network switch using the PoE interface.

Optionally, the method includes providing a system on chip having an analog array, digital circuit blocks, a radio frequency (RF) interface, one or more processors, and one or more applications corresponding to a sensor protocol. The one or more applications including at least one the 6Low-PAN or the Thread protocol. Additionally or alternatively, the RF interface utilizes at least one of a BLTE, a ZIGBEE, or a wireless USB. Optionally, the method includes receiving electrical power for the SoC and the one or more sensors from the PoE network switch.

Optionally, the method includes coupling the one or more sensors to the interface circuit or the RF interface including at least one of a visible light sensor, an ultraviolet sensor, an infrared sensor, a light amplification by stimulated emission of radiation (e.g., LASER) light sensor, a multi-spectrum light module, a visible light camera, a visible and/or infrared red light camera, a forward looking infrared camera (e.g., LWIR or FLIR), an ultrasonic sensor, an audio sensor, a temperature sensor, a humidity sensor, a vibration sensor, a magnetic sensor, an air pressure sensor, and airflow sensor, a multi-sensor module, a carbon dioxide sensor, an oxygen sensor, a methane sensor, an ammonia sensor, an olfactory sensor, a shock/crash sensor, a proximity sensor, a force sensor, a load sensor, a torque sensor, a strain sensor, a position sensor, a motion/velocity sensor, a radio frequency sensor, a discrete input sensor, a discrete output sensor, an analog input sensor, an analog output sensor, a voltage sensor, a current sensor, a frequency sensor, and/or the like. Additionally or alternatively, the method includes receiving sensor measurements from the interface circuit utilizing at least one of an analog signal, an inter-integrated circuit protocol, a serial peripheral interface bus protocol, a universal serial bus protocol, or data packets.

Optionally, the method includes providing a removable memory card to store the one or more sensor measurements onto an external memory. The removable memory card is configured for a Micro-SD card memory, a flash memory, a multimedia card memory, or in SD card memory. Optionally, the method includes communicatively coupling the PoE network switch protocol with a control system. The control system including a display. The display includes a user interface or a graphical user interface to display the sensor measurements of the one or more sensors. Additionally or alternatively, the vehicle includes a locomotive, a marine vessel, an airplane, or an automobile.

In an embodiment, a sensing method for an aircraft is provided. The method includes enabling a Power over Ethernet (PoE) interface through a network interface port. The network interface port including a plurality of twisted pair cables that couple the network interface port to a PoE network switch. The network interface port provides a common interface for coupling to an electrical power system of the aircraft. The method includes coupling a system on chip (SoC) to the network interface port. The SoC having an analog array, digital circuit blocks, a radio frequency (RF) interface, one or more processors, and one or more applications corresponding to a sensor protocol. The one or more applications includes at least one the 6LowPan or the Thread protocol. The RF interface utilizes at least one of a BLTE, a ZIGBEE, or a wireless USB. The SoC receives electrical power and one or more sensors from the PoE network switch. The method includes providing a removable memory card to store the one or more sensor measurements onto an external memory. The removable memory card is configured for a Micro SD card memory, a flash memory, a multimedia card memory, or an SD card memory. The method includes providing an interface circuit bi-directionally communicating with one or more sensors to acquire sensor measurements to the PoE network switch using the PoE interface. The interface circuit is operably coupled to the SoC. The method includes receiving sensor measurements from the interface circuit utilizing at least one of an analog signal, an I2C protocol, a SPI bus protocol, a USB protocol, or data packets.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The embodiments herein describe sensor monitors that use a communication protocol such as Power over Ethernet (PoE) interface. For example, the PoE interface embeds data (e.g., data packets) along the electrical power (e.g., 25 W) of vehicle systems. The PoE interface for the sensor monitors provides a standardized and/or common interface for the vehicle systems. The vehicle systems may be or include an airplane, a vehicle (e.g., a car, a truck), a marine vessel, a locomotive, and/or the like. The sensor monitors bi-directionally communicate within networks of the vehicle systems. The sensor monitors may bi-directionally communicate with one or more sensors. Optionally, the sensor monitors may bi-directionally communicate with the one or more sensors wirelessly, such as a BLUETOOTH Low Energy (BTLE), a ZIGBEE, a wireless universal serial bus (USB), and/or the like. Additionally or alternatively, the sensor monitors may communicate with the sensors using an analog array, a mixed signal array, one or more digital circuits, one or more processors, and/or the like.

FIGS. 1A-D illustrate perspective views of vehicle systems 100, according to embodiments of the present disclosure. The sensor monitors 208 (shown in FIG. 2) may be implemented in different vehicle systems 100. For example, the vehicle systems 100 can represent off-highway vehicles (e.g., are not designed or permitted to travel on public roadways), a locomotive 108, a marine vessel 110, an airplane 102, an automobile 106, and/or the like.

Figure 1A:
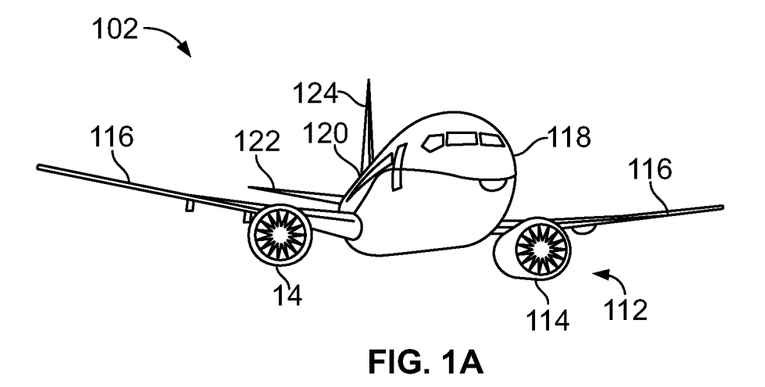
FIGS. 1A-D illustrate perspective views of vehicle systems, according to embodiments of the present disclosure.

FIG. 1A illustrates a perspective view of an aircraft 102. The aircraft 102 includes a propulsion system 112 that may include two turbofan engines 114, for example. Optionally, the propulsion system 112 may include more engines 114 than shown. The propulsion system 112 is coupled to the engines 114, which generate electrical power for the aircraft 102. The engines 114 are carried by wings 116 of the aircraft 102. In other embodiments, the engines 114 may be carried by a fuselage 118 and/or an empennage 120. The empennage 120 may also support horizontal stabilizers 122 and a vertical stabilizer 124. The aircraft 102 is an example of a vehicle system 100 having an electrical power system.

The fuselage 118 of the aircraft 102 defines an internal cabin, which include a cockpit, one or more work sections (for example, galleys, personnel carry-ons, cargo areas, and/or the like), one or more passenger sections (for example, first class, business class, and coach sections), and an aft section.

Figure 1B:
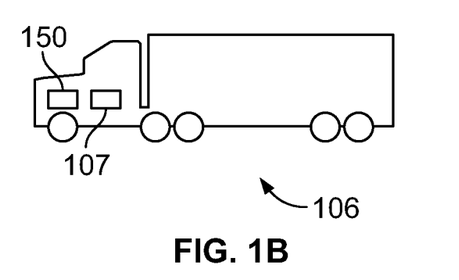

FIG. 1B illustrates a perspective view of an automobile 107. The electrical power system 107 of the automobile 106 is coupled to an engine 150. Like the aircraft 102, the engine 150 of the automobile 106 generates electrical power for the electrical power system 107. For example, the electrical power system 107 provides electrical power throughout the automobile 106. The automobile 106 is an example of a vehicle system 100 having the electrical power system 107.

Figure 1C:
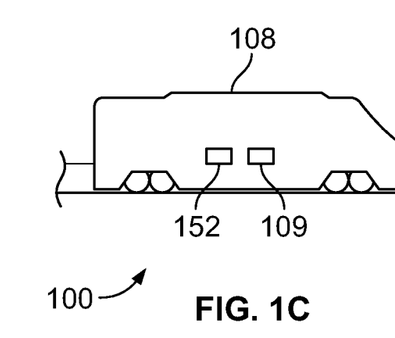

FIG. 1C illustrates a perspective view of a locomotive 108. The electrical power system 109 of the locomotive 108 is coupled to a propulsion system 152 (e.g., diesel engine, electrical engine). Like the aircraft 102, the propulsion system 152 generates electrical power for the electrical power system 109. For example, the electrical power system 109 provides electrical power throughout the locomotive 108. The locomotive 108 is an example of a vehicle system 100 having the electrical power system 109.

Figure 1D:
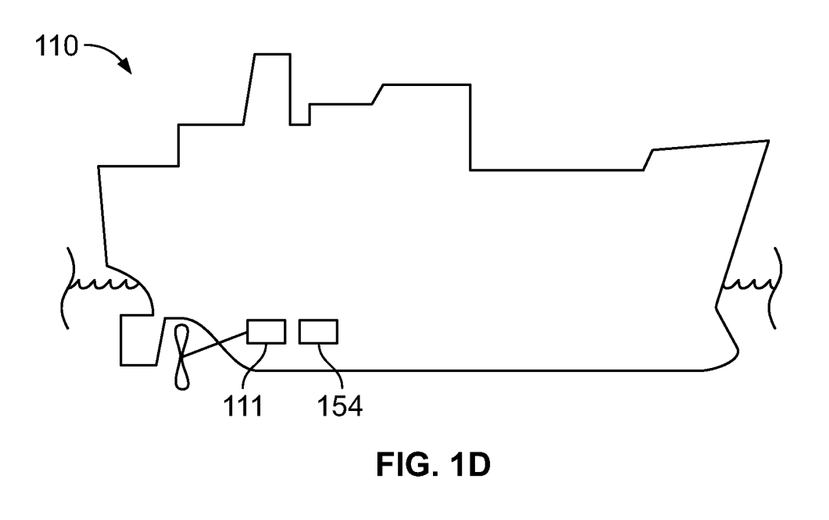

FIG. 1D illustrates a perspective view of a marine vessel 110. The electrical power system 111 of the marine vessel 110 is coupled to a propulsion system 154 (e.g., diesel engine, combustion engine). Like the aircraft 102, the propulsion system 154 generates electrical power for the electrical power system 111. For example, the electrical power system 111 provides electrical power throughout the marine vessel 110. The marine vessel 110 is an example of a vehicle system 100 having the electrical power system 154.

Figure 2:
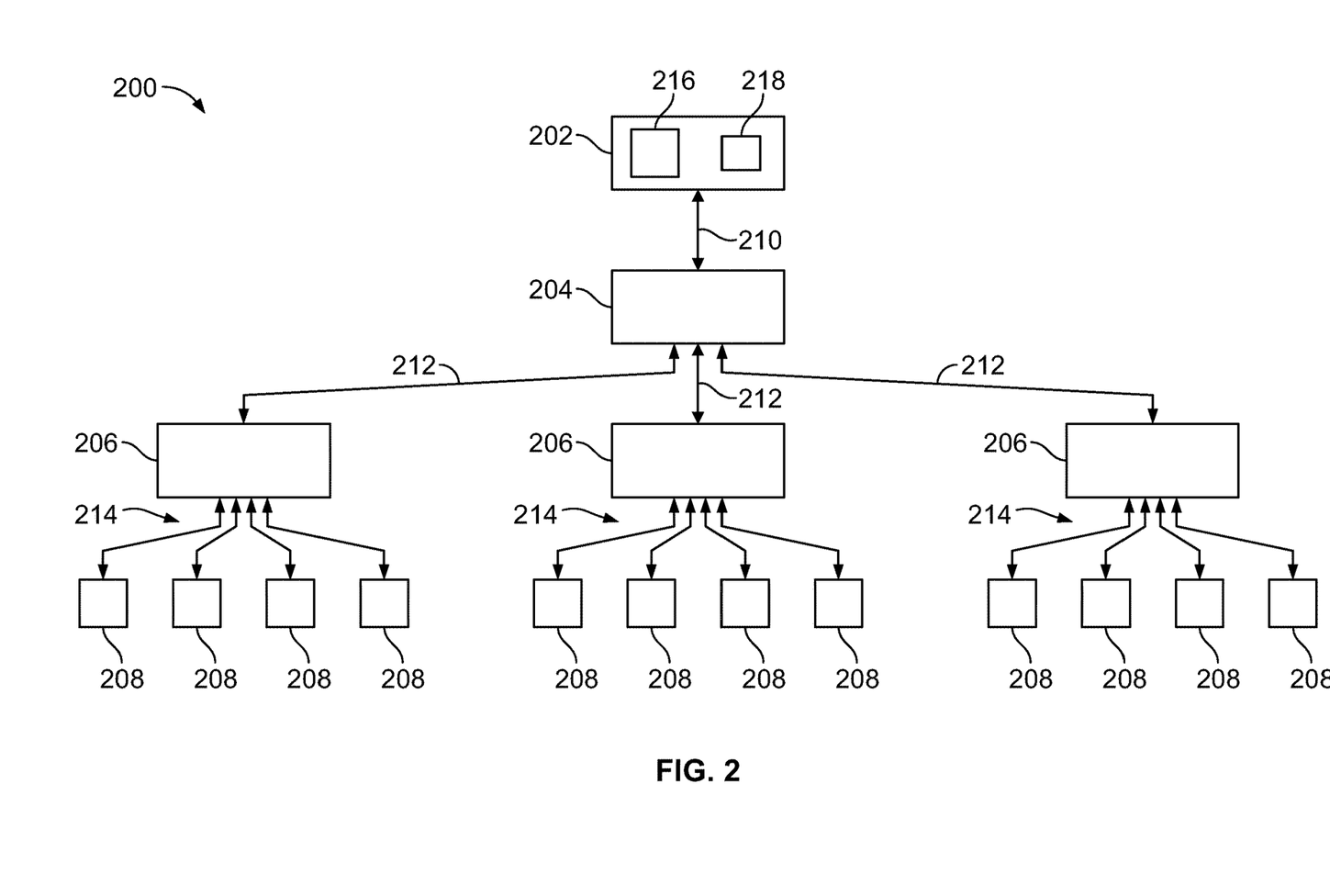
FIG. 2 illustrates a schematic view of a network of a vehicle system, according to an embodiment of the present disclosure.

FIG. 2 illustrates a schematic view of a network 200 of the vehicle systems 100, according to an embodiment of the present disclosure. The network 200 may be included within the vehicle systems 100. For example, the network 200 bi-directionally communicates with different sensor monitors 208 of the vehicle systems 100.

The network 200 includes a server 204 and one or more PoE network switches 206. The PoE network switches 206 are shown bi-directionally communicating with a plurality of the sensor monitors 208 along interfaces 214. For example, the PoE network switches 206 along the interfaces 214 may bi-directionally communicate with one or more of the sensor monitors 208 to receive one or more sensor measurements. The sensor monitors 208 may be operably coupled to one or more sensors. The sensor monitors 208 may bi-directionally communicate with one or more sensors, such as: a visible light sensor; an ultraviolet sensor; an infrared sensor; a light amplification by stimulated emission of radiation (e.g., LASER) light sensor (e.g., LIDAR sensor); a multi-spectrum light module; a visible light camera; a visible and/or infrared red light camera; a forward looking infrared camera (e.g., Long Wavelength Infrared (LWIR) or Forward Looking Infrared (FLIR)); an ultrasonic sensor; an audio sensor; a temperature sensor; a humidity sensor; a vibration sensor (e.g., accelerometer); a magnetic sensor (e.g., Hall effect sensor); an air pressure sensor; an airflow sensor; a multi-sensor module; a carbon dioxide sensor; an oxygen sensor; a methane sensor; an ammonia sensor; an olfactory sensor (e.g., a smell sensor); a shock/crash sensor; a proximity sensor; a force sensor; a load sensor; a torque sensor; a strain sensor; a position sensor; a motion/velocity sensor; a radio frequency (RF) sensor; a discrete input sensor; a discrete output sensor; an analog input sensor; an analog output sensor; a voltage sensor; a current sensor; a frequency sensor; and/or the like.

The PoE network switches 206 receive the sensor measurements from the sensor monitors 208 along the interfaces 214. The PoE network switches 206 transmit the sensor measurements to the server 204. The server 204 bi-directionally communicates with the switches 206 along interfaces 212. The server 204 bi-directionally communicates with a control system 202 along the interface 210. The interfaces 210, 212, and 214 may be based on the PoE interface. For example, the interfaces 210, 212, and 214 embedded data (e.g., data packets) along the electrical power (e.g., 25 W) provided by the vehicle systems 100. The interfaces 210, 212, and 214 allow the sensor monitors 208, the PoE network switches 206, and the server 204 to receive and/or transmit data packets along the electrical power system of the vehicle systems 100. Optionally, the PoE interface is configured based on the protocol defined by the Institute of Electrical and Electronics Engineers (IEEE) 802.3 and 802.3at, which are incorporated by reference in its entirety.

The control system 202 may include one or more processors 218. For example, the control system 202 receives the sensor measurements from the PoE network switches 206 of the network 200. The control system 202 is configured to control and/or operate the vehicle systems 100. The control system 202 includes a display 216. The display 216 is operatively coupled to a user interface, a graphical user interface, and/or the like. Responsive to one or more applications executed by the sensor monitors 208, which indicate sensor measurements outside predefined thresholds, an error signal, and/or the like. The control system 202 displays one or more alerts on the display 216 responsive to sensor measurements outside the predefined thresholds, the error signals, and/or the like. For example, the display 216 is configured to highlight and/or display an alert corresponding to the sensor measurements outside the predefined thresholds, an error signal, and/or the like. Optionally, the controller system 202 may be operably coupled to a speaker, which provides an auditory alert based on the sensor measurements.

Figure 3:
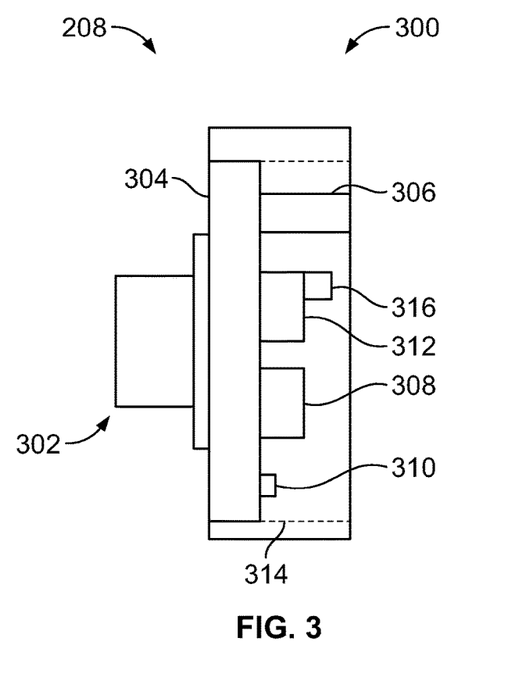
FIG. 3 illustrates a schematic view of a sensor monitor, according to an embodiment of the present disclosure.

FIG. 3 illustrates a schematic view of the sensor monitor 208, according to an embodiment of the present disclosure. The sensor monitor 208 represents a sensing system 300. The sensor monitor 208 includes a network interface port 302. The network interface port 302 is configured to be operably coupled to the PoE network switch 206 along the interface 214. For example, the network interface port 302 may include a plurality of twisted pair cables that couple the network interface port 302 to the electrical power system of the vehicle systems 100. The twisted pair cables provide a data connection and electric power to the sensor monitor 208. For example, the network interface port 302 couples the sensor monitor 208 to the electrical power system of the vehicle systems 100.

Additionally or alternatively, the network interface port 302 provides a common interface for coupling the sensor monitor 208 to the vehicle systems 100. For example, the network interface port 302 allows the sensor monitor 208 to be operably coupled to different sections of the vehicle systems 100. The network interface port 302 allows the sensor monitor 208 to be operably coupled to different locations of the vehicle systems 100 that have access to the electrical power system. For example, the network interface port 302 enables the sensor monitor 208 to have access to the electrical power systems of the aircraft 102, the automobile 106, the locomotive 108, the marine vessel 110, and/or the like (shown in FIGS. 1A-D). The common interface of the network interface port 302 allows the sensor monitor 208 to couple to the electrical power system of the vehicle systems 100. Further, the network interface port 302 allows the sensor monitor 208 to bi-directionally communicate to the network 200 utilizing the PoE interface.

The network interface port 302 is operably coupled to an interface circuit 304. The interface circuit 304 may include one or more processors and/or one or more memories. For example, the interface circuit 304 executes one or more protocols that translate and/or convert the sensor measurements received from the one or more sensors to a control circuit 312 and/or a system on chip (SoC) 314.

The sensor monitor 208 includes an interface circuit 306. The interface circuit 306 bi-directionally communicates with the one or more sensors. For example, the interface circuit 306 may include one or more processors and/or one or more memories. The one or more memories may store one or more protocols utilized by the interface circuit 306. For example, the interface circuit 306 communicates using an analog signal (e.g., amplitude, frequency, phase), an inter-integrated circuit (I2C) protocol, a serial peripheral interface (SPI) bus protocol, data packets (e.g., binary sequences), and/or the like. The interface circuit 306 converts and/or translates sensor measurements received from the one or more sensors to the control circuit 312 and/or the SoC 314.

The interface circuits 304, 306 are operably coupled to the control circuit 312. The control circuit 312 transmits the sensor measurements to the network 200 (e.g., receiving system) through the PoE network switches 206 using the PoE interface. For example, the control circuit 312 is configured to transmit the sensor measurements throughout the PoE network switches 206 and to the server 204 (shown in FIG. 2). The receiving system includes the network 200. For example, the control circuit 312 transmits the sensor measurements along the interfaces 214 to the PoE network switches 206. The PoE network switches 206 transmit the sensor measurements to the server 204 along the interface 214, which is received by the control system 202. As used herein, the term "control circuit," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. For example, the control circuit 312 may be or include one or more processors that are configured to control operation of the sensor monitor 208, as described herein.

The control circuit 312 is configured to execute a set of instructions that are stored in one or more data storage units or elements (e.g., one or more memories 316), to process data. For example, the control circuit 312 may include or be coupled to the one or more memories 316. The data storage units may also store data or other information as desired or needed. The data storage units may be in the form of an information source or a physical memory element within a processing machine.

The set of instructions may include various commands that instruct the control circuit 312 to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuits, circuitry, or portions thereof that may be implemented as hardware with associated instructions (e.g., software stored on a tangible and non-transitory computer-readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, one or more processors, controllers, or the like. Optionally, the one or more control or processing units may represent processing circuitry such as one or more of a field programmable gate array (FPGA), application specific integrated circuit (ASIC), a microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories 316) for execution by a computer, including RAM memory, ROM memory, EPROM memory, EEPROM memory, and non-volatile RAM (NVRAM) memory. The above data storage unit types are exemplary only and are thus not limiting as to the types of memory usable for storage of a computer program.

Optionally, the control circuit 312 may be expanded to be the SoC 314. The SoC 314 may include one or more processors, digital circuitry, an analog array, the one or more memories 316, and/or a mixed signal array (e.g., digital and analog signals). The SoC 314 may be an integrated circuit (IC) such that all components of the SoC 314 are on a single chip substrate (e.g., single silicon die, a chip). The SoC 314 may be embedded on a single die contained within a single chip package (e.g., a quad flat no-leads package (QFN), a thin quad flat package (TQFP), a small outline integrated circuit (SOIC), a ball grid array (BGA), and/or the like). For example, the analog array allows the SoC 314 to interface with analog signals (e.g., amplitude, frequency, phase) received from the one or more sensors. The digital circuitry allows the SoC 314 to interface with digital signals from the interface circuit 306.

Optionally, the SoC 314 may be integrated with the interface circuits 304 and 306. For example, the SoC 314 may include one or more wired interfaces for coupling the one or more sensors to the sensor monitor 208. For example, the interface circuit 304 may be integrated with and/or a part of the SoC 314. The SoC 314 executes the one or more protocols that translate and/or convert the sensor measurements received from the one or more sensors to the switch 206 over the PoE protocol.

The SoC 314 may further include one or more RF interfaces. For example, the SoC 314 may include a ZIGBEE, BLUETOOTH low energy ("BTLE"), a wireless USB, and/or the like. The SoC 314 may include one or more antennas. For example, the SoC 314 may include a first antenna for ZIGBEE, a second antenna for BTLE, a third antenna for wireless USB, and/or the like.

Optionally, the control circuit 312 and/or the SoC 314 may execute one or more applications. The one or more applications may represent sensor protocols configured to analyze and/or identify the sensor measurements acquired from the one or more sensors. The one or more applications may include predefined thresholds, error signals, alerts, and/or the like from the sensor measurements. For example, the one or more applications may represent a Wireless Personal Area Networks utilizing 6LowPAN or a Thread protocol, and/or the like over an Internet Protocol (e.g., IPv4, IPv6) based on the PoE interface. The SoC 314 may identify from the received sensor measurements, which of the one or more sensors that indicate an issue (e.g., outside the predefined thresholds), an error signal, and/or the like.

Optionally, the control circuit 312 may be operably coupled to an RF interface 308. The RF interface 308 may include one or more processors and one or more memories. The one or more memories may store different protocols utilized by the RF interface 308. For example, the different protocols of the RF interface 308 may include the ZIGBEE, the BTLE, the wireless USB, and/or the like. The RF interface 308 executes the one or more protocols, which translate and/or convert the sensor measurements received wirelessly from the one or more remote sensors to the sensor monitor 208.

Additionally or alternatively, the sensor monitor 208 may include a power supply back up battery 310. The power supply back up battery 310 may represent a rechargeable battery, such as a lithium-ion battery, a lithium-ion polymer battery, and/or the like. The power supply back up battery 310 may be operably connected to the interface circuit 304. The interface circuit 304 may include one or more voltage regulators, and/or the like.

For example, the one or more voltage regulators are configured to charge and/or deliver isolated/conditioned power from the power supply back up battery 310. The one or more voltage regulators reduce a voltage and/or current of the electrical power system provided by the vehicle systems 100. The one or more voltage regulators reduce the electrical power received through the electrical power system to charge the power supply backup battery 310. The power supply back up battery 310 is operably coupled to the control circuit 312 and/or the SoC 314.

Additionally or alternatively, the control circuit 312 and/or the SoC 314 is operably coupled to the electrical power system of the vehicle systems 100. The control circuit 312 and/or the SoC 314 may receive power through the network interface port 302. For example, the control circuit 312 and/or the SoC 314 receive power through the PoE network switches 206 using the PoE interface. The PoE network switches 206 provide the PoE interface to the sensor monitor 208, which allows the control circuit 312 and/or the SoC 314 to receive power. Optionally, the control circuit 312 and/or the SoC 314 may receive power to provide electrical power for the one or sensors. For example, the sensor monitor 208 receives power through the interface circuits 304, 306 through PoE interface, which provides electrical power to the one or more sensors. The one or more voltage regulators, and/or the like of the interface circuit 304 reduce the voltage and/or current from the electrical power system. The PoE interface allows the control circuit 312 and/or the SoC 314 to be electrically coupled to the electrical power system of the vehicle systems 100 through the PoE network switches 206.

Figure 4:
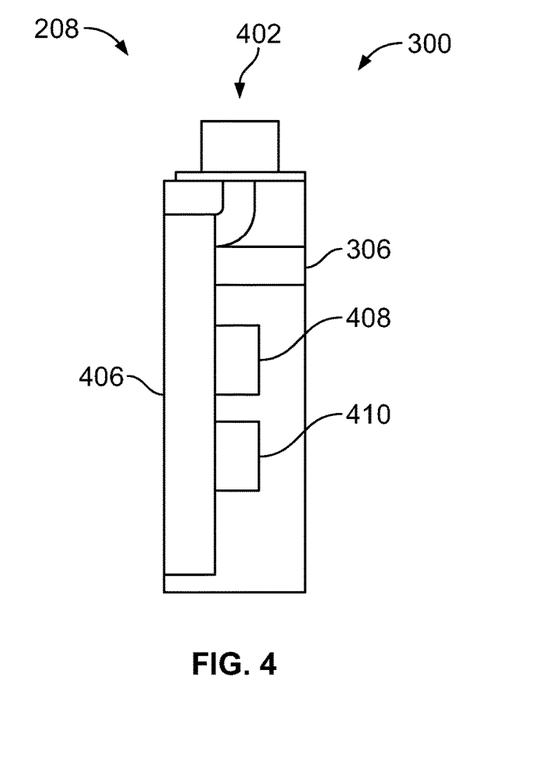
FIG. 4 illustrates a schematic view of a sensor monitor, according to an embodiment of the present disclosure.

FIG. 4 illustrates a schematic view of the sensor monitor 208, according to an embodiment of the present disclosure. The sensor monitor 208 represents a sensing system 300. The sensor monitor 208 includes a port 402. The port 402 is configured to bi-directionally communicate to the one or more sensors. For example, the port 402 may include a plurality of twisted pairs that couple the port 402 to one or more sensors. The port 402 may represent a USB port.

The port 402 may be operably coupled to a USB interface circuit 406. The USB interface circuit 406 includes one or more processors and one or more memories that store the USB protocol. Optionally, the USB interface circuit 406 is operably coupled to the control circuit 312. For example, the USB interface circuit 406 allows the control circuit 312 to bi-directionally communicate with the one or more sensors utilizing the USB protocol. Optionally, the SoC 314 may be integrated with the USB interface circuit 406.

Additionally or alternatively, the sensor monitor 208 may bi-directionally communicate to the one or more sensors using the interface circuit 306 (shown in FIG. 3). For example, the interface circuit 306 may bi-directionally communicate with one or more sensors that communicate utilizing protocols other than USB. The interface circuit 306 shown in FIG. 4 may represent different interfaces and/or connections that couple the one or more sensors to the sensor monitor 208. The interfaces and/or connections of the interface circuit 306 may include the analog signal, the I2C protocol, the SPI bus protocol, the data packets, and/or the like.

Additionally or alternatively, the RF interface 308 (shown in FIG. 3) is operably coupled to one or more antennas 408. For example, the one or more antennas 408 may correspond to the RF protocols implemented by the RF interface 308. The one or more antennas 408 may correspond to the ZIGBEE, the BTLE, the wireless USB, and/or the like. Optionally, the one or more antennas 408 and/or the RF interface 308 may be integrated with the SoC 314.

Optionally, the sensor monitor 208 may include a removable memory card 410. The removable memory card 410 may be configured to store one or more sensor measurements onto an external memory. For example, the removable memory card 410 may allow for long-term storage of sensor measurements acquired by the sensor monitor 208. Optionally, the removable memory card 410 may provide a connection to an external memory device. For example, the removable memory card 410 may be configured for a Micro SD card memory, a multimedia card memory, an SD card memory, and/or the like. Additionally or alternatively, the removable memory card 410 may include non-volatile computer storage, such as EEPROM, flash memory, a solid-state drive, and/or the like.

Figure 5:
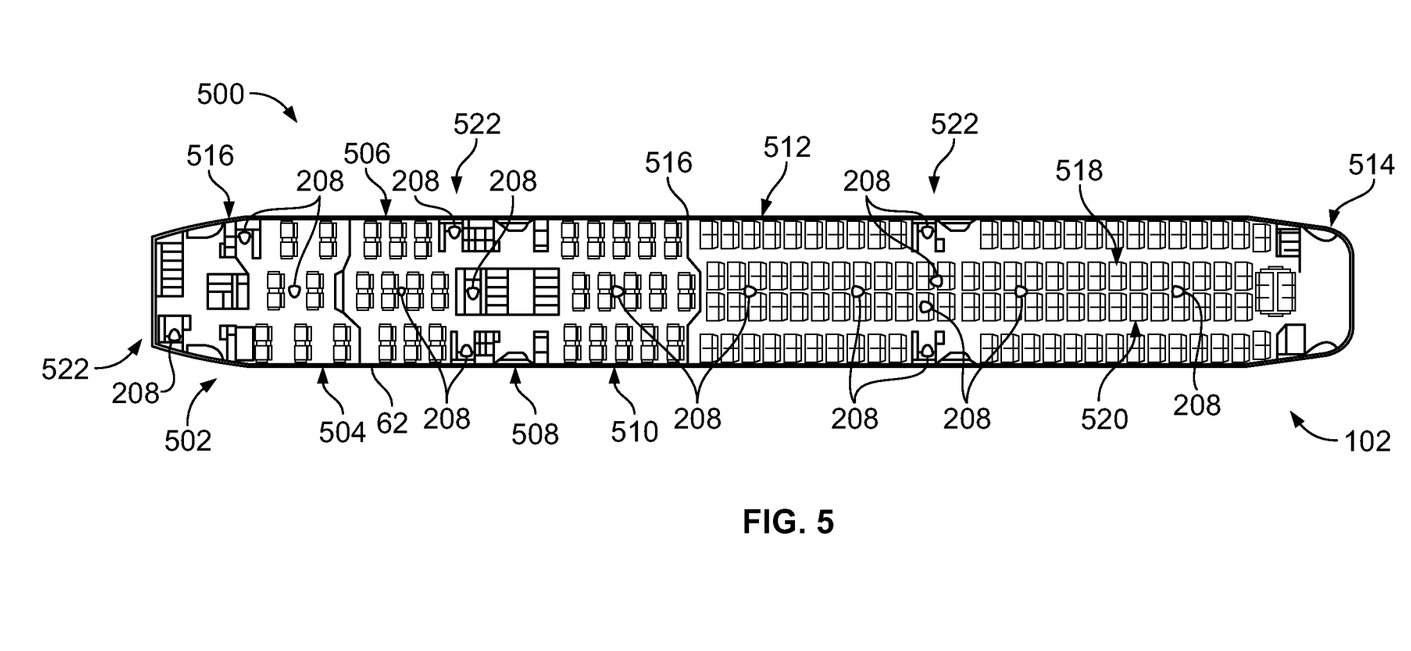
FIG. 5 illustrates a top plan view of an interior cabin of an aircraft, according to an embodiment of the present disclosure.

FIG. 5 illustrates a top plan view of a cabin of the aircraft 102, according to an embodiment of the present disclosure. The interior cabin 500 includes multiple sections or zones, including a front section 502, a first class section 504, a business class section 506, a front galley station 508, a business section 510 (e.g., an expanded economy or coach section), a standard economy or coach section 512, and an aft section 514, which may include multiple lavatories 522 and the galley station 508. It is to be understood that the interior cabin 500 may include more or less sections and zones than shown. For example, the interior cabin 500 may not include a first class section and may include more or less galley stations than shown. Each of the sections may be separated by a cabin transition area 516, which may include class divider assemblies. Overhead stowage bin assemblies may be positioned throughout the interior cabin 500.

The interior cabin 500 includes two aisles 518 and 520 that lead to the aft section 514. Optionally, the interior cabin 500 may have less or more aisles than shown. For example, the interior cabin 500 may include a single aisle that extends through the center of the interior cabin 500 that leads to the aft section 514. The sensor monitors 208 may be positioned throughout the interior cabin 500. For example, the sensor monitors 208 may be positioned at the different lavatories 522 and/or the galley station 508. The sensor monitors 208 may be operably coupled to a carbon dioxide sensor, an ultraviolet light sensor, and/or the like. For example, the carbon dioxide sensor may be configured to detect smoke (e.g., cigarette smoke), fire, and/or the like within the lavatories 522 and/or the galley station 508. The sensor monitors 208 bi-directionally communicate along the interface 214 to the switches 206 (shown in FIG. 2).

For example, the sensor monitors 208 may indicate that smoke and/or fire is detected within the lavatories 522 and/or the galley station 508. Responsive to fire and/or smoke detected by the sensor monitors 208 that are outside the predefined thresholds of the sensor protocols executed by the control circuit 312 and/or the SoC 314 (shown in FIG. 3). For example, the predefined thresholds of the sensor protocols are based on an amount of smoke emitted from a cigarette, a vaporizer, a stove, and/or the like. The sensor measurements of the sensor monitors 208 may be indicated on the user interface, the graphical user interface, and/or the like of the control system 202. The sensor measurements may indicate smoke and/or fire is outside the predefined thresholds of the sensor protocols detected in the lavatories 522 and/or the galley station 508 on the display 216. Additionally or alternatively, the display 216 indicates a location of the sensor monitors 208 that detects the fire and/or the smoke in the lavatories 522 and/or the galley station 508. For example, the display 216 indicates the lavatories 522 and/or the galley station 508 that includes sensor measurements of the sensor monitors 208 detecting the smoke and/or the fire.

Additionally or alternatively, the sensor monitors 208 may be positioned along a ceiling of the first class section 504, the business class section 506, the business section 510, and/or the standard economy or coach section 512. For example, the sensor monitors 208 are operably coupled to an air pressure sensor. The predefined thresholds of the sensor protocols are based on changes in the air pressure within the interior cabin 500. The sensor protocols are based on the one or more applications executed by the control circuit 312 and/or the SoC 314 (shown in FIG. 3). The sensor measurements of the sensor monitors 208 may be indicated on the user interface, the graphical user interface, and/or the like of the control system 202. For example, a change in air pressure detected by the sensor monitors 208 outside the predefined threshold at the first class section 504, the business class section 506, the business section 510, and/or the standard economy or coach section 512 may be indicated on the display 216. Additionally or alternatively, the display 216 indicates locations of the sensor monitors 208 that detects the change in air pressure at the first class section 504, the business class section 506, the business section 510, and/or the standard economy or coach section 512. For example, the display 216 indicates, which of the first class section 504, the business class section 506, the business section 510, and/or the standard economy or coach section 512 that have air pressure outside the predefined thresholds of the sensor protocols.

Figure 6:
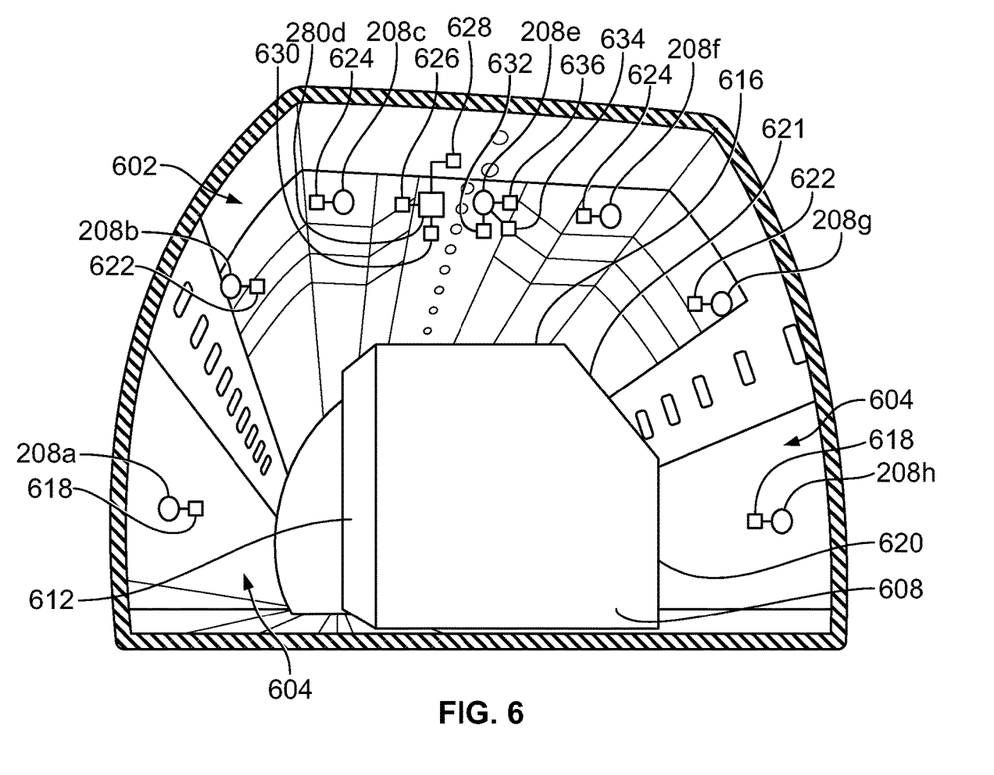
FIG. 6 illustrates a perspective view of a portion of a cargo hold of an aircraft, according to an embodiment of the present disclosure.

FIG. 6 illustrates a perspective view of a portion of a cargo area 602 of the aircraft 102, according to an embodiment of the present disclosure. The cargo area 602 may be positioned under the interior cabin 500 shown in FIG. 5. A plurality of sensor monitors 208a-h are positioned along an interior surface 604 of the cargo area 602.

The sensor monitors 208a and h may be positioned to monitor different positions of a container 608. The sensor monitors 208a and h may be bi-directionally communicate to a vibration sensor or an accelerometer sensor 618. The container 608 includes a top side 616 between the first and second sides 612, 620. The sides 612, 616, 620 of the container 608 may be linear, curved, or have different shapes. The first side 612 is linear in the illustrated embodiment, and the corner between the top side 616 and the second side 620 has a beveled surface 621 which may be considered part of the top side 616 and/or the second side 620. The sensor monitors 208a and h may be operatively coupled to the vibration sensor and/or the accelerometer sensor 618. The sensor monitors 208a and h detects movement of the container 608 during operation of the airplane 102. For example, responsive to the container 608 changing positions within the cargo area 602, the vibration sensor and/or the accelerometer sensor 618 detects an amount of force delivered to the container 608. Based on a detected amount of force, the sensor monitors 208a and h may determine whether the container 608 may have been damaged.

The sensor monitors 208b and g may bi-directionally communicate to humidity sensors 622. For example, the sensor monitors 208b and g are utilized to determine a humidity within the cargo area 602. For example, the predefined threshold of the sensor protocols is 90% humidity defined by the one or more applications executed by the control circuit 312 and/or the SoC 314 (shown in FIG. 3). The humidity may deform the container 608. The humidity sensors 622 may indicate that the humidity is outside the predefined thresholds of the sensor protocols. The sensor measurements of the sensor monitors 208b and g may be indicated on the user interface, the graphical user interface, and/or the like on the control system 202. For example, the control system 202 may display an alert on the display 216 indicating that the humidity is at 90%.

The sensor monitors 208c and f may bi-directionally communicate to a carbon dioxide sensor 624, an ultraviolet light sensor 624, a multi-spectrum light module 624, and/or the like. The sensor monitors 208c and f are utilized to detect fire and/or smoke within the cargo area 602. For example, the sensors 624 of the sensor monitors 208c and f detect fire and/or smoke within the cargo area 602 that are outside the thresholds of the sensor protocols. The sensor measurements of the sensor monitors 208c and f may be indicated on the user interface, the graphical user interface, and/or the like on the control system 202. For example, the control system 202 may display an alert on the display 216 indicating fire and/or smoke is within the cargo area 602.

The sensor monitor 208d may bi-directionally communicate to the visible light camera 626, the proximity sensor 628, the motion/velocity sensor 630, and/or the like. The sensor monitor 208d is utilized to determine movement within the cargo area 602. The proximity sensor 628 and/or the motion/velocity sensor 630 detects movement within the cargo area 602. For example, the predefined threshold of the sensor protocols may represent a velocity above one meter per second. The motion/velocity sensor 630 detects movement, which is received by the sensor monitor 208d. Additionally or alternatively, responsive to movement detected within the cargo area 602 by the proximity sensor 628 and/or the motion/velocity sensor 630, the sensor monitor 208d may instruct the visible light camera 626 to acquire an image of the movement. The sensor measurements of the sensor monitor 208d may be indicated on the user interface, the graphical user interface, and/or the like on the control system 202. For example, the control system 202 may display an alert on the display 216 indicating an image acquired by the visible light camera 626.

The sensor monitor 208e may bi-directionally communicate to a methane sensor 632, an ammonia sensor 634, an olfactory sensor 636, and/or the like. The methane sensor 632 and/or the ammonia sensor 634 may detect hazardous material within the cargo area 602. For example, the methane sensor 632 and/or the ammonia sensor 634 detect a build-up of methane and/or ammonia within the cargo area 602. The sensor measurements of the sensor monitor 208e may be indicated on the user interface, the graphical user interface, and/or the like on the control system 202. For example, the control system 202 may display an alert on the display 216 indicating a buildup of ammonia and/or methane within the cargo area 602.

Optionally, an output of the olfactory sensor 636 may be compared to a set of detected "smells" (e.g., methane, ammonia, alcohol, dynamite, Tovex, C-4 plastic explosives, potassium chlorate, dynamite, and/or the like) of the olfactory sensor 636 with one or more memories 316 of the sensor monitor 208e. For example, the control circuit 312 and/or the SoC 314 (shown in FIG. 3) may compare the detected smells of the olfactory sensor 636 stored on the one or more memories 316. For example, the detected smell may represent a binary sequence, analog signal, digital bytes, and/or the like stored on the one or more memories 316. The control circuit 312 and/or the SoC 314 may compare the detected smell with the detected smells stored on the one or more memories 316. The sensor measurements of the sensor monitor 208e may be indicated on the user interface, the graphical user interface, and/or the like by on the control system 202. For example, the control system 202 may display an alert on the display 216 indicating the identified smell within the cargo area 602.

Figure 7:
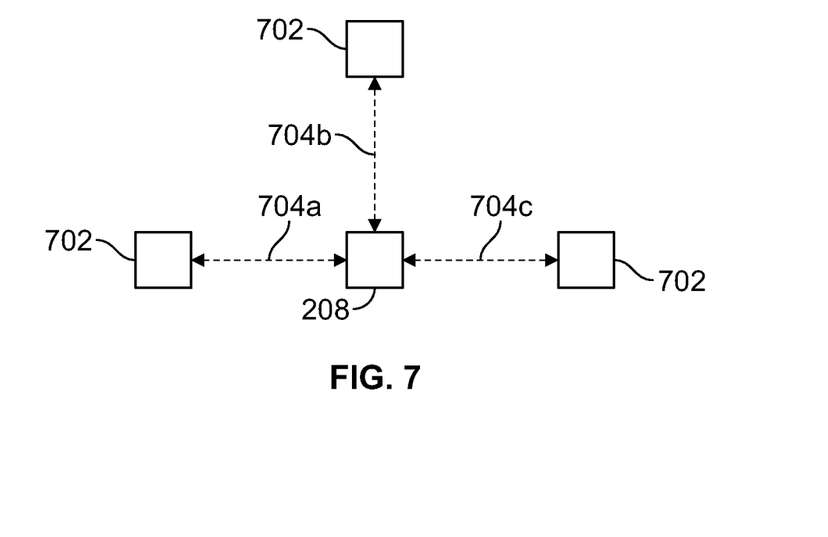
FIG. 7 illustrates a schematic view of wireless bridges between a sensor monitor and one or more cameras, according to an embodiment of the present disclosure.

FIG. 7 illustrates a schematic view of wireless bridges 704a-c between the sensor monitor 208 and one or more cameras 702, according to an embodiment of the present disclosure. For example, the one or more cameras 702 may be positioned externally on the fuselage 118, externally on the aircraft 102, the engines 114, the wings 116, and/or the like (shown in FIG. 1A). The sensor monitor 208 may represent a wireless hub (e.g., a collection of the one or more cameras 702) that wirelessly couples a plurality of sensors to the sensor monitor 208. The wireless bridges 704a-c allow the one or more cameras 702 to wirelessly bi-directionally communicate to the sensor monitor 208 utilizing the RF interface 308 (shown in FIG. 3). The sensor monitor 208 may wirelessly bi-directionally communicate to the one or more cameras 702 using the ZIGBEE, the BTLE, the wireless USB, and/or the like. The sensor monitor 208 may communicate with the one or more cameras 702 utilizing the RF interface 308. The wireless bridges 704a-c are formed based on the protocols (e.g., the ZIGBEE, the BTLE, the wireless USB) defined by the RF interface 308. Optionally, the RF interface 308 may be integrated with the SoC 314.

The wireless bridges 702a-c allow the sensor monitor 208 to wirelessly bi-directionally communicate with the one or more cameras 702. The sensor monitor 208 may wirelessly bi-directionally communicate the one or more cameras 702 to the switches 206 (shown in FIG. 2). The sensor measurements from the one or more cameras 702 are directed to the server 204 and the control system 202. The images from the one or more cameras 702 are indicated on the user interface, the graphical user interface, and/or the like on the display 216.

Figure 8:
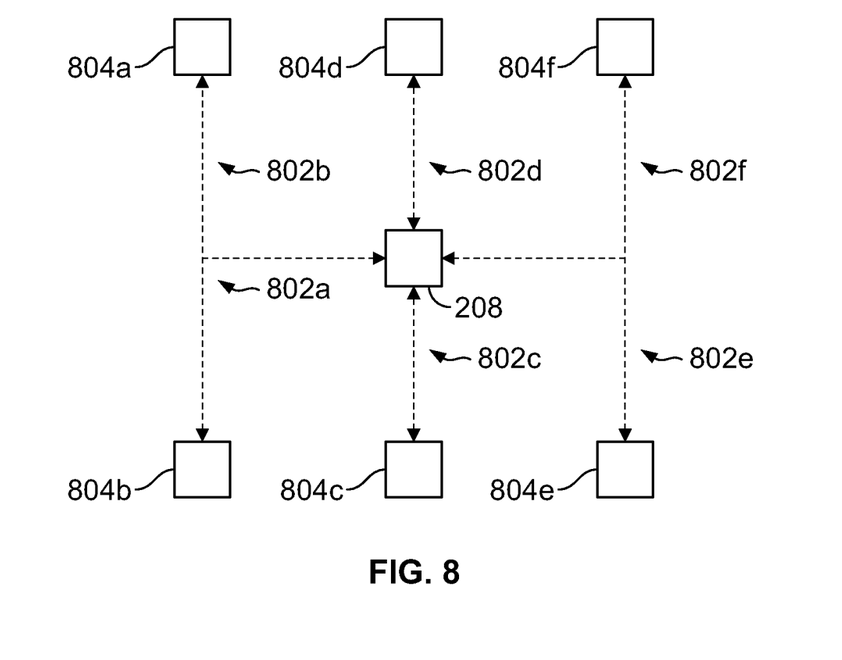
FIG. 8 illustrates a schematic view of wireless bridges between a sensor monitor and a plurality of sensors, according to an embodiment of the present disclosure.

FIG. 8 illustrates a schematic diagram of wireless bridges 802a-f between the sensor monitor 208 and a plurality of sensors 804a-f, according to an embodiment of the present disclosure. For example, the sensor monitor 208 may wirelessly bi-directionally communicate with the sensors 804a-f utilizing the RF interface 308 (shown in FIG. 3). The sensor monitor 208 may represent a wireless hub that wirelessly couples the plurality of sensors 804a-f to the sensor monitor 208. The sensor monitor 208 may wirelessly bi-directionally communicate with the plurality of sensors 804a-f using the ZIGBEE, the BTLE, the wireless USB, and/or the like from the RF interface 308. For example, the RF interface 308 forms the wireless bridges 802a-f with the plurality of sensors 804a-f. The wireless bridges 802a-g are formed based on the protocols defined by the RF interface 308. Optionally, the RF interface 308 may be integrated with the SoC 314.

The wireless bridges 802a-f allow the sensor monitor 208 to wirelessly bi-directionally communicate with the plurality of sensors 804a-f. The wireless bridges 802a-f allow the sensor monitor 208 to communicate with the plurality of sensors 804a-f in the cargo area 602 (shown in FIG. 6), the interior cabin 500 (shown in FIG. 5), external to the aircraft 102, and/or the like. The RF interface 308 allows the sensor monitor 208 to bi-directionally communicate with the plurality of sensors 804a-f.

For example, the plurality of sensors 804a-f may communicate with different sensors. The sensor 804a may include a UV light sensor, a carbon dioxide sensor, and/or a multi-spectrum light module. The sensor 804b may include the visible light camera. The sensor 804c may include the air pressure sensor. The sensor 804d may include the olfactory sensor. The sensor 804e may include the oxygen sensor. The sensor 804f may include the ammonia sensor. The sensor monitor 208 wirelessly bi-directionally communicates with the plurality of sensors 804a-f to the switches 206 (shown in FIG. 2). The sensor measurements from the plurality of sensors 804a-f are directed to the server 204 and the control system 202. The sensor measurements of the sensor monitor 208 are shown on the user interface, the graphical user interface, and/or the like on the control system 202.

Figure 9:
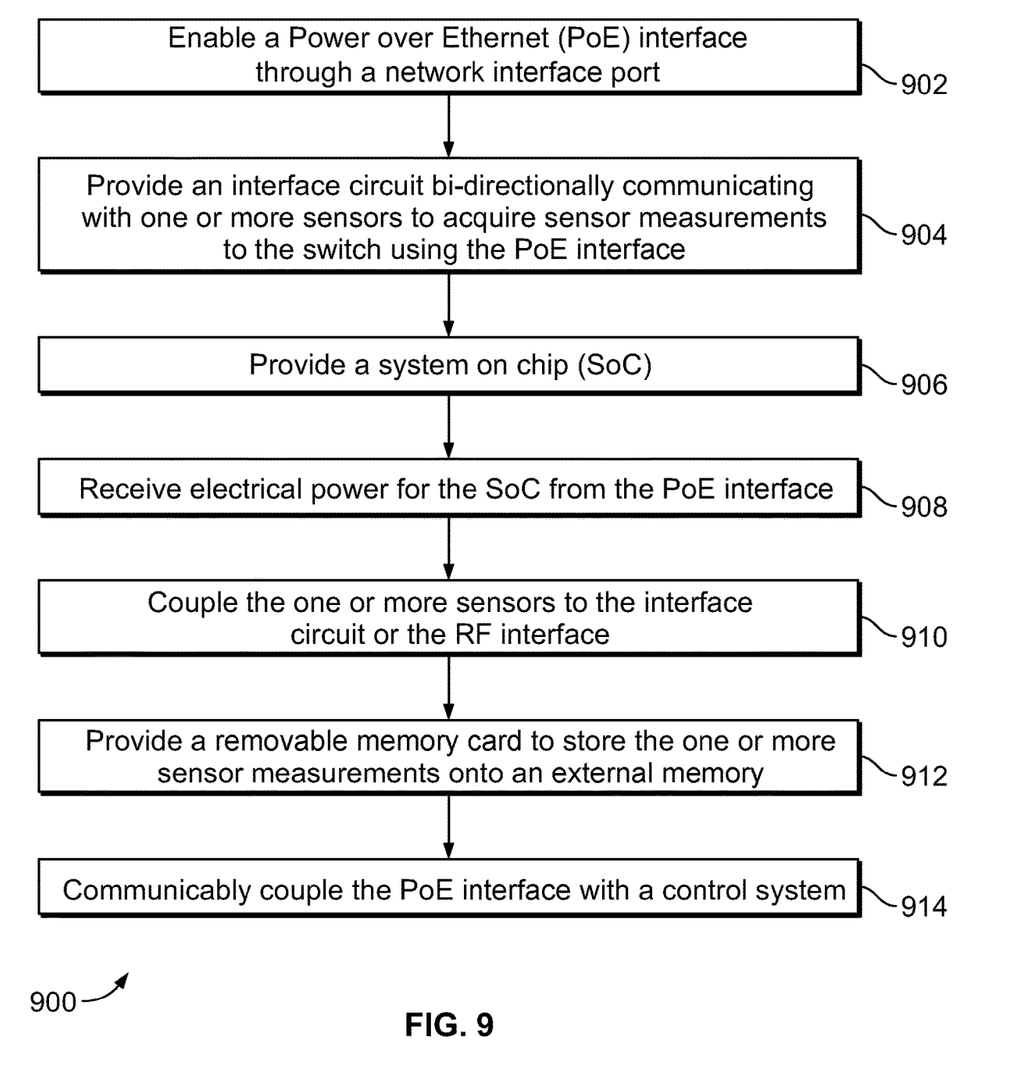
FIG. 9 illustrates a flowchart of a sensing method to provide a sensor monitor, according to an embodiment of the present disclosure.

FIG. 9 illustrates a flowchart of a sensing method 900, according to an embodiment of the present disclosure. The sensing method 900, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, or certain steps may be performed in a different order.

Beginning at 902, a PoE interface is enabled through the network interface port 302. For example, the network interface port 302 may include a plurality of twisted-pair cables that couple the network interface port 302 to the PoE network switches 206 and/or the network 200 (shown in FIG. 2). The twisted-pair cables provide a data connection electric power to the sensor monitor 208. The twisted-pair cables embed data (e.g., data packets) along the electrical power (e.g., 25 W) to the electrical power systems of the vehicle systems 100. The network interface port 302 provides a common interface for coupling the sensor monitor 208 to the vehicle systems 100. For example, the network interface port 302 allows the sensor monitor 208 to be operably coupled to the electric power systems of different types of the vehicle systems 100. The network interface port 302 enables the sensor monitor 208 to have access to the electrical power systems of the aircraft 102, automobile 106, the locomotive 108, the marine vessel 110, and/or the like (shown in FIGS. 1A-D). The common interface of the network interface port 302 allows the sensor monitor 208 to couple to the electrical power systems of the vehicle systems 100, and bi-directionally communicate to the network 200 utilizing the PoE interface.

At 904, an interface circuit 304 bi-directionally communicating with one or more sensors to acquire sensor measurements to the PoE network switches 206 (shown in FIG. 2) using the PoE interface is provided. The interface circuit 304 may include one or more processors. The interface circuit 304 bi-directionally communicates to the one or more sensors operably coupled to the sensor monitor 208. For example, the interface circuit 304 executes the one or more protocols stored on one or more memories that translate and/or convert the sensor measurements received from the one or more sensors to the control circuit 312 and/or the SoC 314, The interface circuit 304 communicates utilizing the analog signal, the I2C protocol, the SPI bus protocol, the data packets, and/or the like. For example, the one or more sensors may be coupled to the interface circuit 304 using a cable and/or conduit. The interface circuit 304 is operably coupled to the control circuit 312.

Additionally or alternatively, the one or more sensors may be coupled to the sensor monitor 208 using the port 402. For example, one or more sensors may utilize the USB protocol to communicate with the sensor monitor 208. The sensor measurements from the one or more sensors are received by the control circuit 312 using the USB interface circuit 406 (shown in FIG. 4).

At 906, the SoC 314 is provided. For example, the control circuit 312 may be expanded to be the SoC 314. The SoC 314 may include one or more processors, digital circuitry, and analog array, the one or more memories 316, and/or a mixed-signal array. Optionally, the SoC 314 may further include one or more RF interfaces. For example, the SoC 314 may include the ZIGBEE, the BTLE, the wireless USB, and/or the like. Additionally or alternatively, the SoC 314 may include one or more antennas that represent the different RF interfaces supported by the SoC 314. Optionally, the SoC 314 may be integrated with the interface circuits 304 and 306.

Additionally or alternatively, the SoC 314 can execute the one or more applications. The one or more applications may represent sensor protocols configured to analyze and/or identify the sensor measurements acquired from the one or more sensors. The one or more applications may define the sensor protocols. For example, the one or more applications may represent the 6LoWPan, the Thread protocol, and/or the like along the PoE interface.

At 908, electrical power for the SoC 314 is received from the PoE interface. For example, the interface circuit 304 may include one or more voltage regulators, and/or the like. The one or more voltage regulators are configured to reduce a voltage received from the electrical power system of the vehicle systems 100 from the PoE network switches 206. The SoC 314 may receive electrical power from the one or more voltage regulators from the interface circuit 304. Additionally or alternatively, the SoC 314 may receive electrical power from the power supply 310.

At 910, the one or more sensors are coupled to the interface circuit 304, 306, the USB interface 402, and/or the RF interface 308. The one or more sensors may be operably coupled to the interface circuits 304, 306 and/or the USB interface circuit 406. Optionally, the one or more sensors may wireless bi-directionally communicate with the sensor monitor 208 using wireless bridges 704a-704c, 802a-802f (shown in FIGS. 7 and 8).

At 912, the removable memory card 410 is provided to store the one or more sensors measurements onto an external memory. The removable memory card 410 may allow for long-term storage of sensor measurements acquired by the sensor monitors 208. The removable memory card 410 may be configured for a Micro SD card memory, a flash memory, multimedia card memory, and SD card memory, and/or the like.

At 914, the PoE interface is coupled to the control system 202. For example, the sensor monitors 208 bi-directionally communicate with the PoE network switches 206. The PoE network switches 206 bi-directionally communicate to the control system 202 through the PoE interface. The control system 202 is configured to control and/or operate the vehicle systems 100. The control system 202 includes a display 216. The display 216 is operatively coupled to a user interface, a graphical user interface, and/or the like. Responsive to the one or more applications indicating sensor measurements outside the predefined thresholds, an error signal, and/or the like, the control system 202 displays an alert on the display 216. For example, the display 216 is configured to highlight and/or display an alert corresponding to the sensor measurements outside the thresholds, an error signal, and/or the like.

As described above, embodiments of the present disclosure provide systems and methods for sensor monitors that utilize a common interface. The common interface operably couples the sensor monitor to the electrical power systems of the vehicle systems. The common interface enables the sensor monitors to bi-directionally communicate with one or more sensors throughout the vehicle systems. Additionally or alternatively, the common interface provides a standard sensor monitor for the different vehicle systems.

While various spatial and directional terms, such as top, bottom, lower, mid, lateral, horizontal, vertical, front and the like may be used to describe embodiments of the present disclosure, that is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A sensing system for a vehicle, comprising:
   a control circuit including one or more processors, wherein the control circuit is communicatively coupled to a Power over Ethernet (PoE) network switch based on a PoE interface, wherein the control circuit receives power from the PoE network; and
   an interface circuit bi-directionally communicating with sensors to acquire sensor measurements, wherein the sensors differ from one another, wherein the control circuit transmits the sensor measurements to a network through the PoE network switch using the PoE interface,
   wherein the control circuit is operably coupled to a network interface port using the PoE interface, and wherein the network interface port provides a standardized and common interface for each and all of the sensors to couple to a plurality of systems of the vehicle and bi-directionally communicate between the plurality of systems of the vehicle and the different sensors that acquire the sensor measurements onboard the vehicle, wherein the network, the PoE network switch, and the network interface port differ from the plurality of systems of the vehicle and the sensors.

2. The system of claim 1, wherein the control circuit is a system on chip having an analog array, digital circuit blocks, a radio frequency (RF) interface, and one or more applications corresponding to a sensor protocol, the one or more applications comprising at least one a Wireless Personal Area Network utilizing 6LowPAN or a Thread protocol.

3. The system of claim 2, wherein the RF interface comprises at least one of a BLUETOOTH Low Energy, a ZIGBEE, or a Wireless Universal Serial Bus (USB).

4. The system of claim 1, wherein the interface circuit communicates utilizing an analog signal, an inter-integrated circuit protocol, a serial peripheral interface bus protocol, or data packets.

5. The system of claim 1, further comprising a removable memory card to store one or more sensor measurements onto an external memory, wherein the removable memory card is configured for a Micro SD card memory, a flash memory, a multimedia card memory, or an SD card memory.

6. The system of claim 1, further comprising a radio frequency (RF) interface operably coupled to the control circuit, wherein the RF interface comprises at least one of a BLUETOOTH Low Energy, a ZIGBEE, or a Wireless Universal Serial Bus (USB), the RF interface defining wireless bridges to one or more sensors.

7. The system of claim 1, the network interface port including a plurality of twisted pair cables that couple the network interface port to the PoE network switch.

8. The system of claim 1, wherein the sensors comprise a visible light sensor, an ultraviolet sensor, an infrared sensor, a light amplification by stimulated emission of radiation light sensor, a multi-spectrum light module, a visible light camera, a visible and/or infrared red light camera, a forward looking infrared camera, an ultrasonic sensor, an audio sensor, a temperature sensor, a humidity sensor, a vibration sensor, a magnetic sensor, an air pressure sensor, an airflow sensor, a multi-sensor module, a carbon dioxide sensor, an oxygen sensor, a methane sensor, an ammonia sensor, an olfactory sensor, a shock/crash sensor, a proximity sensor, a force sensor, a load sensor, a torque sensor, a strain sensor, a position sensor, a motion/velocity sensor, a radio frequency sensor, a discrete input sensor, a discrete output sensor, an analog input sensor, an analog output sensor, a voltage sensor, a current sensor, and a frequency sensor.

9. The system of claim 1, wherein the PoE network switch communicates with a control system, the control system including a display, wherein the display includes a user interface or a graphical user interface to display the sensor measurements of the sensors.

10. The system of claim 1, wherein the vehicle comprises at least one of a locomotive, a marine vessel, an airplane, or an automobile.

11. A sensing method for a vehicle, comprising:
    enabling a Power over Ethernet (PoE) interface through a network interface port, the network interface port including a plurality of twisted pair cables that couple the port to a PoE network switch, wherein the network interface port provides a standardized and common interface for each and all sensors to couple to a plurality of systems of the vehicle and bi-directionally communicate between the plurality of systems of the vehicle and the different sensors that acquire sensor measurements onboard the vehicle, wherein a network, the PoE network switch, and the network interface port differ from the plurality of systems of the vehicle and the sensors;
    providing an interface circuit bi-directionally communicating with the sensors to acquire the sensor measurements, wherein the sensors differ from one another, and wherein the sensor measurements are transmitted to the network through the PoE network switch using the PoE interface.

12. The method of claim 11, further comprising providing a system on chip having an analog array, digital circuit blocks, a radio frequency (RF) interface, one or more processors, and one or more applications corresponding to a sensor protocol, the one or more applications comprising at least one of a Wireless Personal Area Network utilizing 6LowPAN or a Thread protocol.

13. The method of claim 12, wherein the RF interface utilizes at least one of a BLUETOOTH Low Energy, a ZIGBEE, or a Wireless Universal Serial Bus (USB).

14. The method of claim 12, further comprising receiving electrical power for the SoC from the PoE interface.

15. The method of claim 12, further comprising coupling the sensors to the interface circuit or the RF interface, wherein the sensors comprise a plurality of the following: a visible light sensor, an ultraviolet sensor, an infrared sensor, a light amplification by stimulated emission of radiation light sensor, a multi-spectrum light module, a visible light camera, a visible and/or infrared red light camera, a forward looking infrared camera, an ultrasonic sensor, an audio sensor, a temperature sensor, a humidity sensor, a vibration sensor, a magnetic sensor, an air pressure sensor, an airflow sensor, a multi-sensor module, a carbon dioxide sensor, an oxygen sensor, a methane sensor, an ammonia sensor, an olfactory sensor, a shock/crash sensor, a proximity sensor, a force sensor, a load sensor, a torque sensor, a strain sensor, a position sensor, a motion/velocity sensor, an radio frequency sensor, a discrete input sensor, a discrete output sensor, an analog input sensor, an analog output sensor, a voltage sensor, a current sensor, and a frequency sensor.

16. The method of claim 11, further comprising receiving sensor measurements from the interface circuit utilizing at least one of an analog signal, an inter-integrated circuit protocol, a serial peripheral interface bus protocol, a universal serial bus protocol, or data packets.

17. The method of claim 11, further comprising providing a removable memory card to store the one or more sensor measurements onto an external memory, wherein the removable memory card is configured for a Micro SD card memory, a flash memory, a multimedia card memory, or an SD card memory.

18. The method of claim 11, further comprising communicably coupling the PoE network switch with a control system, the control system including a display, wherein the display includes a user interface or a graphical user interface to display the sensor measurements of the sensors.

19. The method of claim 11, wherein the vehicle comprises at least one of a locomotive, a marine vessel, an airplane, or an automobile.

20. A sensing method for an aircraft, comprising:
enabling a Power over Ethernet (PoE) interface through a network interface port, the network interface port including a plurality of twisted pair cables that couple the network interface port to a PoE network switch, wherein the port provides a standardized and common interface for each and all sensors that differ from one another to couple to a plurality of systems of the aircraft and bi-directionally communicate between the plurality of systems of the aircraft and the different sensors that acquire sensor measurements onboard the aircraft, wherein a network, the PoE network switch, and the network interface port differ from the plurality of systems of the aircraft and the sensors;

coupling a system on chip (SoC) to the network interface port, the SoC having an analog array, digital circuit blocks, a radio frequency (RF) interface, one or more processors, and one or more applications corresponding to a sensor protocol, the one or more applications comprising at least one of a Wireless Personal Area Network utilizing 6LowPAN, or a Thread protocol, wherein the RF interface utilizes at least one of a BLUETOOTH Low Energy, a ZIGBEE, or a Wireless Universal Serial Bus (USB), the SoC receiving electrical power from the PoE interface;

providing an interface circuit bi-directionally communicating with the sensors to acquire sensor measurements to the PoE network switch using the PoE interface, wherein the interface circuit is operably coupled to the SoC;

providing a removable memory card to store the one or more sensor measurements onto an external memory, wherein the removable memory card is configured for a Micro SD card memory, a flash memory, a multimedia card memory, or an SD card memory; and receiving the sensor measurements from the interface circuit utilizing at least one of an analog signal, an inter-integrated circuit protocol, a serial peripheral interface bus protocol, a universal serial bus protocol, or data packets.

21. The system of claim 1, wherein the systems of the vehicle are a propulsion system and an electrical power system.

* * * * *